UNITED STATES PATENT OFFICE.

HENRY S. SPACKMAN, OF ARDMORE, PENNSYLVANIA, AND ELLIS W. LAZELL, OF WILMINGTON, DELAWARE, ASSIGNORS, BY MESNE ASSIGNMENTS, TO HENRY S. SPACKMAN, OF ARDMORE, PENNSYLVANIA.

CEMENTITIOUS MATERIAL.

1,029,953.     Specification of Letters Patent.     Patented June 18, 1912.

No Drawing.     Application filed March 29, 1909. Serial No. 486,432.

*To all whom it may concern:*

Be it known that we, HENRY S. SPACKMAN, a resident of Ardmore, Montgomery county, State of Pennsylvania, and ELLIS W. LAZELL, formerly a resident of the city and county of Philadelphia, State of Pennsylvania, and now a resident of Wilmington, county of Newcastle, and State of Delaware, have made a certain new and useful Invention Relating to Cementitious Materials and Preparation Thereof, of which the following is a specification.

This invention relates to cementitious, that is to say, plastic materials or compositions, such as plasters, hydraulic and other cements, comprising incorporated calcium aluminates or equivalent strength accelerating material, and relates more particularly to slow-setting, hydraulic, calcium aluminate material comprising low-lime calcium aluminate and the preparation and incorporation of such energizing material with other cementitious material comprising available lime or similar earthy alkali material, to accelerate the cementitious or binding properties thereof.

Calcium aluminate material, such as is formed preferably by thoroughly calcining or sintering a relatively small proportion of available lime as compared with the available alumina present, attains its initial set after a relatively long period and its final set in a relatively short time thereafter. Such low-lime calcium aluminate cement materials, besides being themselves more or less strongly hydraulic and cementitious, exert a valuable energizing action on cementitious material comprising lime or other earthy alkali material (such as magnesia, baryta, strontia, or other material capable of combining with coöperating silicious material and calcium aluminate strength accelerating material). When incorporated for example with natural cements their cementitious or binding properties are accelerated so as to greatly increase the early sand strengths of the mixed material in the same general way as when using the calcium aluminate accelerators described in the Spackman and Lazell Patent 903,018, of November 3, 1908; while at the same time it is easier to prevent the composition having an undesirably quick initial set. Such low-lime calcium aluminates may preferably be prepared by uniting suitably proportioned mixtures of finely ground lime, magnesia or other earthy alkali with bauxite or other material rich in alumina or alumina-like material, the components being incorporated in such proportions that the lime for example is present to the extent of not more than about thirty-three per cent. of the alumina available for combination therewith after making due allowance for the lime required by any other components that may be present. This may be conveniently done by heating to the extent required to cause sufficient union of the components to develop the desired strength accelerating, slow-setting and other properties as by calcination to a clinkering or sintering temperature and if desired the material without the necessity of grinding may be still further heated to complete fusion as in a blast furnace after which it may be advantageously granulated in water or otherwise before being ground, the higher the temperature of union the slower as a general thing is the setting action. It is of course understood that iron oxid or similar material may be used in some cases to replace to some extent at least the alumina in this accelerating material, and that other earthy alkali material, such as magnesia and so forth, may be substituted for part at least of the lime combined, that is, more or less closely united therewith, such calcium aluminates and equivalent or substitute accelerating or energizing material being designated earthy alkali, strength accelerating compounds of alumina-like material.

Suitable proportions of low-lime calcium aluminate or similar strength accelerating material and also if desired of controlling material to assist in effecting the desired quickness of set and increase of strength may be prepared and incorporated at any time before utilization with the independently cementitious material comprising oxids, hydrates or otherwise available lime or similarly acting earthy alkali material combining or capable of combining with the aluminous accelerating material and coöperating silicious material which may also be present if desired. The aluminous accelerating material preferably in finely divided condition may be prepared and incorporated before or after the gaging of the cementitious material or may be dissolved or incorporated in the gaging water; preferably, however, the strength accelerating and controlling material may be uniformly incorporated with the independently cementitious material so as to form a finely divided material convenient for transportation and utilization since it becomes immediately effective when water is added thereto.

Hydraulic cements having high strengths at early periods and comprising large proportions of calcium aluminate or the like with coöperating lime or equivalent earthy alkali material in connection with coöperating silicious material and controlling material if desired, may be prepared by having present a sufficient proportion of slow-setting calcium aluminate to give the desired setting time to the compositions, which in many cases have sand strengths at early periods considerably in excess of the standard Portland cement requirements. Many low-limed calcium aluminates with higher limed, quick setting calcium aluminate produce cements having much greater strength than ordinary Portland cements and partaking of the slow-setting qualities of low lime calcium aluminates. An illustrative composition of this character may be prepared by making a finely divided mixture of low lime, slow-setting, hydraulic, highly cementitious, calcium aluminate produced by thorough calcination and having the following approximate analysis:

| | |
|---|---|
| Silica ($SiO_2$) | 2.12% |
| Alumina ($Al_2O_3$) | 65.32 |
| Iron ($Fe_2O_3$) | 12.16 |
| Lime (CaO) | 20.94 |
| Magnesia (MgO) | .44 |
| Volatile matter | None. | and an equal proportion of a diversely prepared calcium aluminate higher in lime, having an initial set of five minutes and a final set of seven minutes and containing:

| | |
|---|---|
| Silica ($SiO_2$) | 2.76% |
| Alumina ($Al_2O_3$) | 37.27 |
| Iron ($Fe_2O_3$) | 6.47 |
| Lime (CaO) | 47.12 |
| Magnesia (MgO) | .46 |
| Volatile matter | 2.20 |

This composite hydraulic composition when tested according to the standard methods adopted by the American Society of Civil Engineers and prescribed by the American Society for Testing Materials in conjunction with the standard specifications for testing of Portland cements, gave the following results:

Setting time: Gilmore's needle per cent. of water, 28; initial set, 5 hrs.; final set, 5 hrs. 30 min.; constancy of volume, O. K.

*Tensile test: 1 part mixture, 3 parts sand, kept in water after 24 hours.*

| | 24 hours. | 7 days. | 28 days. | 3 months. |
|---|---|---|---|---|
| | Lbs. | Lbs. | Lbs. | Lbs. |
| | 375 | 515 | 510 | 685 |
| | 395 | 485 | 515 | 705 |
| | 385 | 500 | 512 | 695 |
| Average | 385 | 500 | 512 | 695 |

*Tensile test: same 1 to 3 mixture, kept in air.*

| | 7 days. | 28 days. | 3 months. |
|---|---|---|---|
| | Lbs. | Lbs. | Lbs. |
| | 370 | 580 | 775 |
| | 360 | 595 | 785 |
| | 380 | 565 | 765 |
| Average | 370 | 580 | 775 |

The quickness of set can, of course, be regulated by a small addition of suitable retarding agent and can be further controlled to a considerable extent by varying the proportions used of the slow-setting and quick-setting calcium aluminates such as described in our Patent No. 903,018 and in our co-pending application filed September 27, 1907 as Serial No. 394,916 from which subject matter has been taken for insertion in this continuing application, and which refers to similarly accelerating calcium aluminum compounds of substantially the composition of calcium aluminates containing from about one to three molecules of lime to one of alumina which may be prepared for instance by calcining finely ground lime and bauxite or other aluminum compound such as kaolin or high alumina clays. Other materials may be incorporated with such composite, hydraulic, slow-setting strength accelerator if desired, such as hydraulic, independently cementitious materials, or if desired suitable proportions of finely divided, inert materials or stretchers, such as finely ground silicia which may be used up to about twice the amount of the combined calcium aluminate material where the cement is to be used for ordinary purposes. An illustrative composition of this character may be prepared by mixing fifty parts of finely ground sand, twenty-five parts of the above slow-setting, low-lime calcium aluminate, twenty-five parts of the higher lime, quick setting calcium aluminate, all being ground to such fineness as to pass the #100 mesh sieve. This cement when tested in the usual manner for Portland cement with the addition of three parts, by weight, of standard Ottawa sand, gave the following results:

Setting time: Initial set, 4 hrs. 35 minutes; final set, 6 hrs. 39 minutes.

Tensile tests: 24 hours, 168 lbs.; 7 days, 198 lbs.; 28 days, 240 lbs.

A similar composition using inert stretchers was made of one half of this slow-setting, low-lime calcium aluminate, one-half finely ground sand. This when tested in the manner usual for Portland cement with the addition of three parts, by weight, of standard Ottawa sand, gave the following physical tests:

Tensile tests: 24 hours, 83 lbs.; 7 days, 198 lbs.; 28 days, 332 lbs.

The low-lime, slow-setting calcium aluminate cement materials when used alone have a longer period of plasticity, not acquiring their initial set as a rule under ten hours but develop very high strength shortly afterward. An illustrative example, when tested in the usual manner for Portland cement did not acquire its initial set under ten hours yet when tested one part cement to three parts sand, by weight, gave at 24 hours 233 pounds, and at seven days 435 pounds. Such low-lime, slow-setting calcium aluminate cement material and also composite strength accelerating material comprising the same in admixture with high-lime, quick setting calcium aluminate materials may of course be used when incorporated with suitable proportions of lime. Such slow-setting, strength accelerating material is of course desirable for incorporation with quick-setting natural cements or other quick-setting cementitious materials, it being possible to incorporate considerably larger proportions of the strength accelerating material when these low-lime, slow-setting aluminates are used, or, if desired, to omit or reduce in many cases the calcium sulfate retarding material usually employed to prevent undesirably quick set.

The following comparative test shows the different effect of incorporating with natural cement of the character indicated ten per cent. of low-lime, slow-setting calcium aluminate, such as described, and a similar proportion of quick-setting, hydraulic calcium aluminate, two per cent. of calcium sulfate being present in all cases; it being, of course, understood that such highly cementitious material produced by the incorporation of the aluminates fulfils the constant volume and sand strength requirements for standard Portland cement.

|  | Natural cement. | Natural cement with 10% slow setting aluminate. | Natural cement with 10% higher lime aluminate. |
|---|---|---|---|
| Initial set | 1 hr. 35 min. | 3 hrs. 14 min. | 20 minutes. |
| Final set | 2 hrs. 40 min. | 4 hrs. 14 min. | 30 minutes. |
| Tensile strengths: 1 part cement, 3 parts sand— | | | |
| 24 hrs | No strength. | 175 lbs. | 150 lbs. |
| 7 days | 95 lbs. | 288 lbs. | 200 lbs. |
| 28 days | 150 lbs. | 368 lbs. | 270 lbs. |

Several illustrative examples of slow-setting, hydraulic, aluminous, strength accelerating materials containing considerable silica and which were completely fused during their manufacture so as to have comparatively slight strengths at early periods when used alone or in the absence of available lime were produced in a blast furnace using iron ores containing approximately fourteen per cent. of alumina, these aluminous slags had the following approximate analyses:

|  | No. 1. | No. 2. |
|---|---|---|
| Silica (SiO$_2$) | 29.12% | 31.96% |
| Alumina (Al$_2$O$_3$) | 34.28 | 28.94 |
| Iron (Fe) | 2.40 | 2.39 |
| Lime (CaO) | 29.82 | 28.46 |
| Magnesia (MgO) | 2.32 | 3.78 |

The following comparative test shows the result of incorporating ten per cent. of the strength accelerating material indicated in the second analysis given above with the following natural cement in comparison with a similar incorporation of quick-setting, higher lime aluminate, strength accelerating material with the same natural cement.

|  | Natural cement. | Natural cement with 10% slow setting, low lime aluminate. | Natural cement with 10% higher lime aluminate. |
|---|---|---|---|
| Initial set | 1 hr. 35 min. | 6 hrs. 9 min. | 20 minutes. |
| Final set | 2 hrs. 40 min. | 8 hrs. | 30 minutes. |
| Tensile test: 1 part cement, 3 parts sand— | | | |
| 7 days | 95 lbs. | 230 lbs. | 200 lbs. |
| 28 days | 156 lbs. | 335 lbs. | 270 lbs. |

The fused calcium aluminate strength accelerating material having the second analysis given above, when mixed with an equal proportion of low-lime calcined calcium aluminate material such as referred to in connection with the first analysis given in this application, produced a slow-setting highly cementitious material which gave when tested in the ordinary way for cement with three parts of sand the following tensile strengths: 180 pounds at seven days, 490 pounds at twenty-eight days and 530 pounds at three months. Such high alumina, high silica material can also be advantageously used either alone or in conjunction with low-lime, slow-setting calcium aluminate as an addition to independently cementitious material, such as lime. Similar composite aluminate strength accelerating materials produce hydraulic highly cementitious material when incorporated with considerable proportions of finely ground inert materials, silicious stretchers or coöperating silicious and other materials, and may be advantageously incorporated with natural cements, for example: a mixture containing ten parts fused calcium aluminate containing considerable proportions of silica, analysis #2, two parts plaster, eighty-eight parts natural cement, when tested in the manner usual for cement had an initial setting time of 6 hours 9 minutes and a final setting time of 8 hours; and when tested in water with three parts of sand had 230 pounds tensile strength at seven days and 335 pounds at twenty-eight days. Such fused aluminous and other calcium aluminate strength accelerating material may be advantageously incorporated in comparatively small proportions with lime or similar alkali material, these compositions comprising from about one to ten per cent. of incorporated alumina and having greatly increased setting spreading and sand-carrying properties. Suitable illustrative plaster compositions may be prepared by incorporating five to twenty per cent. of such fused calcium aluminate strength accelerating cement material with ordinary hydrated lime, in connection, if desired, with suitable stretchers or other ingredients.

The following table shows the tensile strengths when tested with four parts of commercial sand, of hydrated lime with which ten and fifteen per cent. of this fused aluminous material containing a considerable amount of silica had been incorporated:

|  | Hydrated lime with 10% aluminate. | Hydrated lime with 15% aluminate. |
| --- | --- | --- |
| 24 hours | 35 lbs. | 38 lbs. |
| 7 days | 60 lbs. | 68 lbs. |
| 28 days | 75 lbs. | 78 lbs. |

Having described the invention in connection with a number of illustrative ingredients, proportions, formulas, and methods of preparation, to the details of which disclosure the invention is not of course to be limited, what is claimed as new and what is desired to be secured by Letters Patent is set forth in the appended claims:

1. The slow-setting hydraulic highly cementitious material having sand strengths considerably greater than and fulfilling the constant volume requirements for standard Portland cement comprising large proportions of slow-setting, highly cementitious, strength accelerating earthy alkali compounds rich in alumina-like material and comprising coöperating cementitious material including earthy alkali material.

2. The hydraulic highly cementitious material having sand strengths considerably greater than and fulfilling the constant volume requirements for Portland cement comprising large proportions of cementitious, composite, strength accelerating earthy alkali compounds rich in alumina-like material.

3. The hydraulic highly cementitious material having sand strengths considerably greater than and fulfilling the constant volume requirements for hydraulic cement comprising considerable proportions of composite, strength accelerating earthy alkali compounds rich in alumina-like material including earthy alkali compounds of alumina-like material comprising considerable silica and including diversely prepared earthy alkali compounds of alumina-like material.

4. The highly cementitious material having sand strengths considerably greater than and fulfilling the constant volume requirements for hydraulic cement comprising considerable proportions of composite, strength accelerating earthy alkali compounds rich in alumina-like material and comprising coöperating cementitious material.

5. A highly cementitious material fulfilling the sand strength and constant volume requirements for hydraulic cement comprising considerable proportions of slow-setting, composite, strength accelerating earthy alkali compounds of alumina-like material and comprising considerable proportions of coöperating earthy alkali or silicious material.

6. The highly cementitious material substantially fulfilling the sand strength and constant volume requirements for hydraulic cement comprising considerable proportions of slow-setting strength accelerating earthy alkali compounds rich in alumina-like material and comprising quick-setting hydraulic independently cementitious material including available earthy alkali material.

7. The highly cementitious material fulfilling the sand strength and constant volume requirements for hydraulic cement comprising a small proportion at least of slow-setting strength accelerating, earthy alkali compounds of alumina-like material and comprising large proportions of natural cement.

8. The highly cementitious material fulfilling the sand strength and constant volume requirements for hydraulic cement comprising small proportions at least of slow-setting strength accelerating calcium aluminate material and comprising large proportions of natural cement.

9. The highly cementitious material fulfilling the sand strength and constant volume requirements for hydraulic cement comprising a small proportion at least of slow-setting, strength accelerating calcium aluminate material rich in alumina including fused calcium aluminate material and comprising large proportions of natural cement.

10. The cementitious material fulfilling the constant volume requirements for standard Portland cement comprising small proportions at least of slow-setting, composite, strength accelerating high aluminous compounds and comprising large proportions of natural cement.

11. The cementitious material fulfilling the sand strength and constant volume requirements for hydraulic cement comprising small proportions at least of slow-setting strength accelerating highly aluminous compounds and comprising considerable proportions of natural cement.

12. The slow-setting cementitious material fulfilling the sand strength and constant volume requirements for hydraulic cement comprising small proportions at least of slow-setting, hydraulic, strength accelerating calcium aluminate material rich in alumina and comprising considerable proportions of natural cement.

13. The slow-setting cementitious material comprising small proportions at least of slow-setting, strength accelerating earthy alkali compounds rich in alumina-like material and comprising considerable proportions of natural cement.

14. The slow-setting cementitious material comprising small proportions at least of slow-setting, strength accelerating fused earthy alkali compounds rich in alumina-like material and comprising considerable proportions of coöperating cementitious material.

15. The cementitious material comprising considerable proportions of composite, strength accelerating earthy alkali compounds of alumina-like material containing considerable proportions of silica and including diversely prepared earthy alkali compounds of alumina like material and comprising considerable proportions of coöperating material.

16. The cementitious material comprising considerable proportions of artificially proportioned, slow-setting strength accelerating earthy alkali compounds rich in alumina-like material and comprising considerable proportions of coöperating cementitious material.

17. The slow-setting cementitious material comprising considerable proportions of artificially proportioned, slow-setting accelerating earthy alkali compounds rich in alumina-like material.

18. The cementitious material comprising considerable proportions of slow-setting, high aluminous accelerating material capable of accelerating the setting and cementitious properties of coöperating cementitious material comprising available lime when incorporated therewith.

19. The cementitious material comprising considerable proportions of slow-setting, hydraulic high aluminous compounds combined at great heat and comprising considerable proportions of coöperating material including earthy alkali material.

20. The slow-setting cementitious material comprising considerable proportions of slow-setting earthy alkali compounds rich in alumina-like material and comprising considerable proportions of coöperating material including earthy alkali material.

21. The slow-setting cementitious material comprising considerable proportions of calcium aluminate material rich in alumina including earthy alkali compounds of alumina-like material low in earthy alkali material and containing between 25 and 40 per cent. of alumina and of silica and comprising considerable proportions of coöperating cementitious material including available earthy alkali material.

22. The cementitious material comprising considerable proportions of artificially proportioned slow-setting earthy alkali compounds of alumina-like material low in earthy alkali material and comprising considerable proportions of coöperating cementitious material including available earthy alkali material.

23. The cementitious material comprising considerable proportions of fused earthy alkali compounds of alumina-like material low in earthy alkali material and containing between 25 and 40 per cent. of alumina and of silica and comprising considerable proportions of coöperating cementitious material including available earthy alkali material.

24. The cementitious material comprising small proportions at least of artificially proportioned fused calcium aluminate material rich in alumina and low in lime and containing substantially equal considerable proportions of alumina and silica and comprising considerable proportions of coöperating cementitious material including available earthy alkali material.

25. The cementitious material comprising small proportions at least of artificially proportioned fused calcium aluminate material rich in alumina and low in lime and containing considerable silica and comprising considerable proportions of coöperating cementitious material including available earthy alkali material.

26. The cementitious material comprising small proportions at least of artificially proportioned slow-setting earthy alkali compounds of alumina-like material including fused slow-setting earthy alkali compounds of alumina-like material containing between 25 and 40 per cent. of alumina and considerable silica and comprising large proportions of coöperating material including available earthy alkali material.

27. The cementitious material comprising small proportions at least of cementitious earthy alkali compounds rich in alumina-like material containing considerable silica and between about 25 and 40 per cent. of alumina and capable of accelerating the setting and cementitious properties of coöperating cementitious material comprising available lime when incorporated therewith and comprising considerable proportions of coöperating cementitious material.

28. The cementitious material comprising small proportions at least of slow-setting, hydraulic, highly cementitious high aluminous compounds combined at considerable heat and capable of accelerating the setting and cementitious properties of coöperating cementitious material comprising available lime when incorporated therewith and comprising coöperating cementitious material.

29. The cement material capable of developing and accelerating the cementitious properties of coöperating cementitious material containing available lime when incorporated therewith and comprising artificially proportioned, slow-setting, composite, calcium aluminate material including calcium aluminate material rich in alumina and combined at great heat and including diversely prepared earthy alkali compounds of alumina-like material.

30. The cement material capable of accelerating the cementitious properties and early strengths of coöperating cementitious material containing available lime when incorporated therewith and comprising artificially proportioned, composite earthy alkali compounds rich in alumina-like material and containing considerable silica.

31. The cement material capable of accelerating the cementitious properties and early strengths of coöperating cementitious material including available lime when incorporated therewith and comprising slow-setting, highly cementitious strength accelerating material including calcined calcium aluminate material rich in alumina.

32. The cement material capable of accelerating the hydraulic and cementitious properties and early strengths of coöperating cementitious material containing available lime when incorporated therewith and comprising slow-setting, highly cementitious strength accelerating material including calcined calcium aluminate material rich in alumina and containing less lime than about one-third of the available alumina combined therewith.

33. The cement material capable of accelerating the hydraulic and cementitious properties and early strengths of coöperating cementitious material containing available lime when incorporated therewith and comprising slow-setting, highly cementitious strength accelerating material including calcined earthy alkali compounds of alumina-like material containing less earthy alkali material than about one-third of the available alumina-like material combined therewith.

34. The cement material capable of accelerating the hydraulic and cementitious properties and early strengths of coöperating cementitious material containing available lime when incorporated therewith and comprising slow-setting highly cementitious strength accelerating material including earthy alkali compounds of alumina-like material combined at great heat and containing less earthy alkali material than about one-third of the available alumina-like material combined therewith.

35. The cement material capable of developing and accelerating the hydraulic and cementitious properties and early strengths of coöperating cementitious material containing available lime when incorporated therewith and comprising slow-setting, highly cementitious strength accelerating material including earthy alkali compounds of alumina-like material low in earthy alkali material and combined at great heat.

36. The cement material capable of developing and accelerating the hydraulic and cementitious properties and early strengths of coöperating cementitious material containing available lime when combined therewith and comprising slow-setting, highly cementitious strength accelerating material including earthy alkali compounds of alumina-like material.

37. The cement material capable of developing and accelerating the hydraulic and cementitious properties of coöperating cementitious material containing available lime when incorporated therewith and comprising slow-setting, highly cementitious accelerating earthy alkali compounds of alumina-like material combined at considerable heat.

38. The cement material capable of accelerating the setting properties of coöperating cementitious material containing available lime when incorporated therewith and consisting in greater part of artificially proportioned, slow-setting calcium aluminate accelerating material containing considerable silica combined at great heat, rich in alumina and low in lime and containing alumina to the extent of not less than three-quarters of the silica.

39. The cement material capable of accelerating the setting properties and early strengths of coöperating cementitious material containing available lime when incorporated therewith and comprising artificially proportioned, slow-setting, strength accelerating earthy alkali compounds of alumina-like material rich in alumina-like material including earthy alkali compounds of alumina-like material combined at great heat containing considerable silica and rich in alumina-like material.

40. The cement material capable of accelerating the setting properties of coöperating cementitious material containing available lime when incorporated therewith and comprising artificially proportioned, slow-setting, highly cementitious calcium aluminate accelerating material rich in alumina including calcium aluminate material low in lime and containing between 25 and 40 per cent. of alumina and of silica combined at great heat.

41. The cement material accelerating the setting properties of coöperating cementitious material containing available lime when incorporated therewith and comprising artificially proportioned, slow-setting calcium aluminate accelerating material rich in alumina including calcium aluminate material containing between about 25 and 40 per cent. of alumina and of silica combined at great heat.

42. The slow-setting hydraulic highly-cementitious cement material accelerating the setting properties of coöperating cementitious material containing available lime when incorporated therewith and consisting essentially of earthy alkali compounds rich in alumina-like material and containing less earthy alkali than about one-third of the alumina-like material combined therewith at great heat.

43. The cement material accelerating the setting properties of coöperating cementitious material containing available lime when incorporated therewith and comprising fused calcium aluminate material containing between about 25 and 40 per cent. of alumina and containing silica in considerable proportions but less than the alumina.

44. The cement material accelerating the setting properties of coöperating cementitious material containing available lime when incorporated therewith and comprising fused high aluminous low lime material containing considerable silica and in which the alumina exceeds the silica.

45. The slow-setting, hydraulic, highly cementitious cement material consisting in greater part of low lime calcium aluminate material rich in alumina and combined at great heat.

46. The slow-setting, hydraulic, highly cementitious, calcined cement material consisting in greater part of low lime calcium aluminate material rich in alumina.

47. The slow-setting highly cementitious, cement material consisting in greater part of calcium aluminate material rich in alumina.

48. The slow-setting, hydraulic, highly cementitious, cement material consisting in greater part of earthy alkali compounds rich in alumina-like material and containing less earthy alkali than about one-third of the alumina-like material combined therewith at great heat.

49. The slow-setting hydraulic, highly cementitious, composite, cement material consisting essentially of diversely prepared earthy alkali compounds rich in alumina-like material.

50. The slow-setting, hydraulic, highly cementitious, composite, cement material consisting in greater part of diversely prepared earthy alkali compounds comprising earthy alkali strength accelerating compounds rich in alumina-like material and containing less earthy alkali than about one-third of the alumina-like material combined therewith.

51. The slow-setting, hydraulic, highly cementitious, cement material consisting essentially of earthy alkali compounds of alumina-like material including earthy alkali compounds rich in alumina-like material containing between about 20 and 40 per cent. of silica and containing less earthy alkali material than about one-third of the alumina-like material combined therewith at great heat.

52. The slow-setting, highly cementitious, cement material consisting in greater part of calcium aluminate material.

53. The slow-setting, highly cementitious, cement material consisting in greater part of calcium aluminate material rich in alumina and containing less lime than about one-third of the alumina combined therewith.

54. The slow-setting, highly cementitious, cement material consisting in greater part of earthy alkali copounds rich in alumina-like material and low in earthy alkali combined at great heat.

55. The slow-setting, cement material accelerating the setting properties of coöperating cementitious material containing available lime when incorporated therewith and consisting in greater part of artificially proportioned earthy alkali compounds rich in alumina-like material containing less earthy alkali material than about one-third of the alumina-like material combined therewith.

56. The slow-setting, highly cementitious, cement material consisting in greater part of artificially proportioned earthy alkali compounds of alumina-like material.

57. The slow-setting, highly cementitious, cement material consisting in greater part of artificially proportioned earthy alkali compounds rich in alumina-like material, low in earthy alkali and containing considerable silica combined at great heat.

58. The process of manufacturing cement, which consists in melting a mixture of aluminous material and lime, and then cooling and granulating the resulting mass.

59. The process of manufacturing cement, which consists in heating a mixture of aluminous material and lime until a melted mass is obtained, cooling the mass rapidly, then granulating it, and finally subjecting it to trituration.

60. The process of manufacturing cement, which consists in heating substantially to fusion a mixture of lime and aluminous material and in cooling the same to produce a cementitious material rich in alumina.

61. The process of manufacturing cement, which consists in highly heating a mixture of alumina-like material and earthy alkali material and cooling the same to form slow setting cementitious material rich in alumina-like material.

62. The highly cementitious cement material consisting in greater part of artificially proportioned calcium aluminate material rich in alumina and comprising iron.

63. The highly cementitious material comprising lime and rich in alumina, the lime being present in amounts sufficient to be capable of combining in substantially mono-calcic proportions with the alumina in addition to combining with the silica and other materials.

64. A cement formed of a mixture of bauxite and lime.

65. A cement formed of a mixture of lime and a material rich in alumina.

66. A cement comprising lime, and aluminous and ferruginous material.

67. A cement comprising lime, and aluminous and ferruginous material containing relatively little silica.

68. The high aluminous cement material largely formed of a base combined with alumina.

69. The high aluminous cement material formed by the reaction at great heat of material rich in alumina with relatively basic material.

70. The cement material capable of developing and accelerating the cementitious properties and early strengths of coöperating cementitious material containing available lime when incorporated therewith and comprising an artificially proportioned mixture of lime and a material rich in alumina combined at great heat.

71. The cement material capable of developing the cementitious and spreading properties of coöperating cementitious material containing available lime when incorporated therewith and comprising calcium aluminate material.

72. The cement material capable of developing and accelerating the cementitious and spreading properties and early strengths of coöperating cementitious material containing available lime when incorporated therewith and comprising calcium aluminate material formed of a mixture of bauxite and lime.

73. The cement material capable of developing the cementitious and spreading properties of coöperating cementitious material containing available lime when incorporated therewith and comprising an artificially proportioned mixture of lime and a material rich in alumina.

74. The cement material capable of developing the cementitious and spreading properties of coöperating cementitious material containing available lime when incorporated therewith and comprising a mixture of bauxite and coöperating earthy alkali combined at great heat.

75. The cement material capable of developing the cementitious and spreading properties of coöperating cementitious material containing available lime when incorporated therewith and formed of a mixture of bauxite and lime.

76. The cement material capable of developing the cementitious and spreading properties of coöperating cementitious material containing available lime when incorporated therewith and comprising hydraulic calcined calcium aluminate accelerating material.

77. The cement material capable of developing the cementitious and spreading properties of coöperating cementitious material containing available lime when incorporated therewith and comprising artificially proportioned earthy alkali compounds rich in alumina like material.

78. The cement material capable of developing the cementitious and spreading properties of coöperating cementitious material containing available lime when incorporated therewith and comprising artificially proportioned earthy alkali compounds rich in alumina like material combined at great heat.

79. The cement material capable of developing the cementitious and spreading properties of coöperating cementitious material containing available lime when incorporated therewith and comprising artificially proportioned earthy alkali compounds rich in alumina like material and containing iron.

80. The cement material capable of developing and accelerating the setting, cementitious and spreading properties of coöperating cementitious material containing large proportions of lime when incorporated therewith and comprising bauxite and earthy alkali material united therewith.

81. The cement material capable of developing or accelerating the cementitious properties of coöperating cementitious material containing large proportions of available lime when incorporated therewith and formed of a mixture of alumina and a coöperating base.

82. The cement material rich in alumina and capable of developing and accelerating the setting and spreading properties of coöperating cementitious material containing large proportions of available lime when incorporated therewith and formed of an artificially proportioned mixture of aluminous material and basic material capable of reacting therewith.

HENRY S. SPACKMAN.
ELLIS W. LAZELL.

Witnesses as to Henry S. Spackman:
HELEN THOMPSON,
WM. F. KELSH.

Witnesses as to Ellis W. Lazell:
JAMES P. MCGOWAN,
FRANK H. MASON.

EXTENSION OF PATENT.

Patent No. 1,029,953.     Granted June 18, 1912. to

HENRY S. SPACKMAN.

The above entitled patent has been extended, under the provisions of the Act of May 31, 1928, for five years, eleven months and twenty-four days from the expiration of the original term thereof.

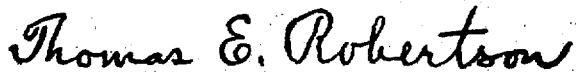

Commissioner of Patents.

April 26, 1930.

lime when incorporated therewith and formed of a mixture of alumina and a coöperating base.

82. The cement material rich in alumina and capable of developing and accelerating the setting and spreading properties of coöperating cementitious material containing large proportions of available lime when incorporated therewith and formed of an artificially proportioned mixture of aluminous material and basic material capable of reacting therewith.

HENRY S. SPACKMAN.
ELLIS W. LAZELL.

Witnesses as to Henry S. Spackman:
HELEN THOMPSON,
WM. F. KELSH.
Witnesses as to Ellis W. Lazell:
JAMES P. MCGOWAN,
FRANK H. MASON.

EXTENSION OF PATENT.

Patent No. 1,029,953. Granted June 18, 1912. to

HENRY S. SPACKMAN.

The above entitled patent has been extended, under the provisions of the Act of May 31, 1928, for five years, eleven months and twenty-four days from the expiration of the original term thereof.

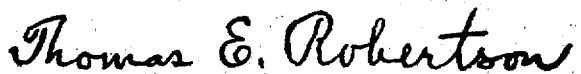

Commissioner of Patents.

April 26, 1930.

EXTENSION OF PATENT.

Patent No. 1,029,953.  Granted June 18, 1912. to

HENRY S. SPACKMAN.

The above entitled patent has been extended, under the provisions of the Act of May 31, 1928, for five years, eleven months and twenty-four days from the expiration of the original term thereof.

Thomas E. Robertson
Commissioner of Patents.

April 26, 1930.